United States Patent
Amte et al.

(10) Patent No.: US 9,931,593 B2
(45) Date of Patent: Apr. 3, 2018

(54) MULTI-COMPRESSION SYSTEM AND PROCESS FOR CAPTURING CARBON DIOXIDE

(71) Applicant: Reliance Industries Limited, Maharashtra (IN)

(72) Inventors: Vinay Amte, Chhattisgarh (IN); Asit Kumar Das, Gujarat (IN); Surajit Sengupta, West Bengal (IN); Manoj Yadav, Haryana (IN); Sukumar Mandal, Haryana (IN); Alok Pal, Uttar Pradesh (IN); Ajay Gupta, Haryana (IN); Ramesh Bhujade, Maharashtra (IN); Satyanarayana Reddy Akuri, Andhra Pradesh (IN); Rajeshwer Dongara, Maharashtra (IN)

(73) Assignee: RELIANCE INDUSTRIES LIMITED, Maharashtra (IN)

(*) Notice: Subject to any disclaimer, the term of this patent is extended or adjusted under 35 U.S.C. 154(b) by 199 days.

(21) Appl. No.: 15/027,384

(22) PCT Filed: Sep. 29, 2014

(86) PCT No.: PCT/IN2014/000629
§ 371 (c)(1),
(2) Date: Apr. 5, 2016

(87) PCT Pub. No.: WO2015/056272
PCT Pub. Date: Apr. 23, 2015

(65) Prior Publication Data
US 2016/0236137 A1    Aug. 18, 2016

(30) Foreign Application Priority Data
Oct. 9, 2013 (IN) .................. 3191/MUM/2013

(51) Int. Cl.
*B01D 53/02* (2006.01)
*B01D 53/12* (2006.01)
*B01D 53/62* (2006.01)

(52) U.S. Cl.
CPC ............. *B01D 53/12* (2013.01); *B01D 53/62* (2013.01); *B01D 2251/30* (2013.01);
(Continued)

(58) Field of Classification Search
CPC .......... B01D 2251/30; B01D 2251/602; B01D 2251/606; B01D 2252/204;
(Continued)

(56) References Cited

U.S. PATENT DOCUMENTS 5,917,136 A    6/1999  Gaffney et al.
6,033,456 A *  3/2000  Jahnke ...................... C01B 3/36
                                                        75/505

(Continued)

FOREIGN PATENT DOCUMENTS

CN    101939075 A    1/2011
EP    2 574 872 A2   4/2013
WO    2012/083108 A2 6/2012

OTHER PUBLICATIONS

International Search Report and Written Opinion for International Application No. PCT/IN2014/000629, dated Apr. 8, 2015, 7 pages.

*Primary Examiner* — Christopher P Jones
(74) *Attorney, Agent, or Firm* — Westman, Champlin & Koehler, P.A.

(57) ABSTRACT

The present disclosure provides a multiple-compression system and a process for capturing carbon dioxide ($CO_2$) from a flue gas stream containing $CO_2$. The disclosure also provides a process for regeneration of the carbon dioxide capture media.

20 Claims, 1 Drawing Sheet

(52) U.S. Cl.
CPC .. *B01D 2251/602* (2013.01); *B01D 2251/606* (2013.01); *B01D 2252/204* (2013.01); *B01D 2253/112* (2013.01); *B01D 2253/1124* (2013.01); *B01D 2253/20* (2013.01); *B01D 2253/25* (2013.01); *B01D 2257/504* (2013.01); *B01D 2258/0283* (2013.01); *B01D 2259/40092* (2013.01); *B01D 2259/65* (2013.01); *Y02C 10/04* (2013.01); *Y02C 10/08* (2013.01)

(58) Field of Classification Search
CPC ...... B01D 2253/112; B01D 2253/1124; B01D 2253/20; B01D 2253/25; B01D 2257/504; B01D 2258/0283; B01D 2259/40092; B01D 2259/65; B01D 53/12; B01D 53/62; Y02C 10/04; Y02C 10/08

See application file for complete search history.

(56) References Cited

U.S. PATENT DOCUMENTS

| | | | |
|---|---|---|---|
| 7,731,782 | B2 | 6/2010 | Kelley et al. |
| 7,947,120 | B2 | 5/2011 | Deckman et al. |
| 8,764,890 | B2 * | 7/2014 | Yi .......................... B01D 53/10 422/144 |
| 8,975,464 | B2 | 3/2015 | Jamal et al. |
| 9,394,171 | B2 * | 7/2016 | Keefer ...................... C01B 3/38 |
| 2006/0165574 | A1 * | 7/2006 | Sayari .................... B01D 53/02 423/210 |
| 2009/0220406 | A1 * | 9/2009 | Rahman ............. B01D 53/1468 423/437.1 |
| 2011/0226010 | A1 | 9/2011 | Baxter |
| 2012/0211348 | A1 * | 8/2012 | Grady ................... B01D 3/002 203/42 |
| 2013/0081426 | A1 | 4/2013 | Lissianski et al. |
| 2014/0105809 | A1 * | 4/2014 | Okumura ............... B01D 53/04 423/437.1 |
| 2014/0251136 | A1 * | 9/2014 | Park ....................... B01D 53/62 95/108 |
| 2015/0217227 | A1 * | 8/2015 | Oishi ................. B01D 53/1425 423/228 |

* cited by examiner

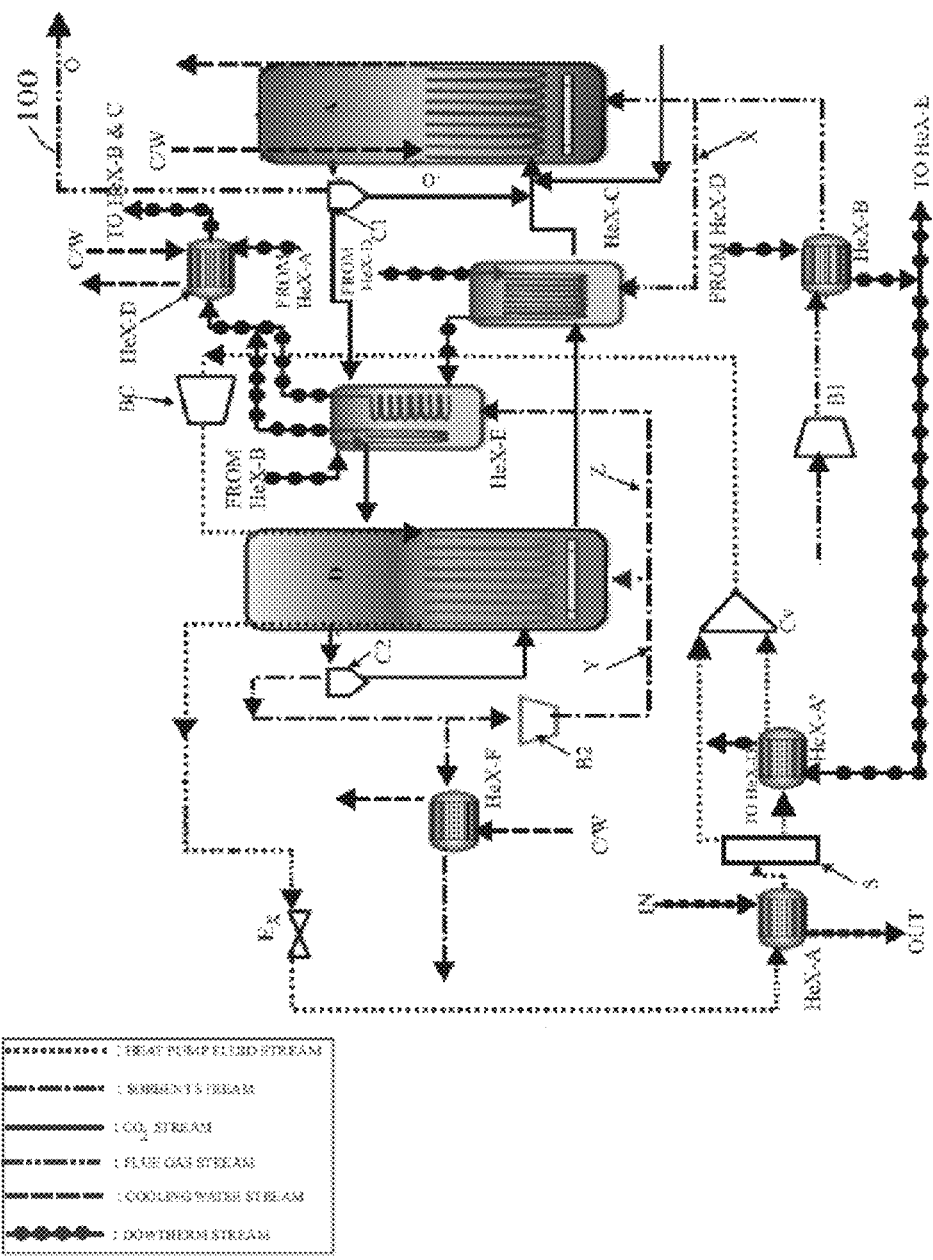

MULTI-COMPRESSION SYSTEM AND PROCESS FOR CAPTURING CARBON DIOXIDE

CROSS-REFERENCE TO RELATED APPLICATION

This Application is a Section 371 National Stage application of International Application No. PCT/IN2014/000629, filed 29 Sep. 2014 and published as WO 2015/056272 A2 on 23 Apr. 2015, in English, the contents of which are hereby incorporated by reference in their entirety.

FIELD

The present disclosure relates to a system and process for capturing carbon dioxide from flue gas using carbon dioxide capture media.

BACKGROUND

Flue gases originating from oil refineries, fossil fuel based power plants, cement plants contain hazardous gaseous pollutants such as sulfur dioxide ($SO_2$), sulfur trioxide ($SO_3$), hydrogen sulfide ($H_2S$), hydrogen chloride (HCl), hydrogen fluoride (HF), nitrogen oxides and carbon dioxide ($CO_2$) that have some severe adverse short-term as well as long-term effects on human health and the environment. Different strategies have therefore been devised for reducing the amount of the afore-stated pollutants from flue gases before they are released into the atmosphere.

The amount of $CO_2$ present in flue gas can be reduced by methods such as burning less coal, improving the efficiency of coal-fired power plants and capturing, followed by storing the captured $CO_2$. Among the $CO_2$ capture techniques such as pre-combustion, post-combustion and oxy-combustion etc., post-combustion is the most promising technique since it does not require any extensive rebuilding of the existing process plant.

Absorption technique such as wet scrubbing amine absorption, is another conventional technique for carbon dioxide capture. However, the absorption techniques are associated with several drawbacks such as (i) limitation in the rate of absorption of $CO_2$ due to diffusional resistance through the liquid phase; (ii) high energy requirement for amine regeneration (2.5-4.0 GJ/ton $CO_2$); (iii) oxidative degradation and acidification of solvent due to the presence of oxygen in the flue gas thereby making it corrosive, in addition to causing loss in the available alkalinity for carbon dioxide capture; (iv) loss of amine due to its appreciable volatility results in equilibrium losses of amine to the treated gas; and (v) thermal degradation of amine, rendering it unsuitable for continued use and hence, the requirement for substantial amounts of fresh make-up amine. Further, it is observed that the amine absorption process is restricted to carbon dioxide capture at ambient temperatures. Furthermore, capturing carbon dioxide using the absorption technique requires energy in the form of electricity or steam or both, that is supplied by process plants like power plants which reduces the overall efficiency of the power plant by up to 13%.

Therefore, there is an increased interest in developing less expensive and/or energy integrated processes for capturing carbon dioxide. The adsorption processes generally employing solid adsorptive material, that fall under the post combustion category, serve as an alternative to the absorption based process. This is because replacing water by solid support greatly reduces the energy required for carbon dioxide capture due to the lower heat capacity of solid supports as compared to water. Published literature on carbon dioxide capture by the adsorption technique shows considerable $CO_2$ capture capacity. However, the high temperature and resource requirements for the regeneration of the capture media influence the overall cost and time efficiency of the process.

U.S. Pat. Nos. 7,731,782 and 7,947,120 disclose adsorption processes that employ zeolite for carbon dioxide capture and utilize the heat of compression of the resulting carbon dioxide rich stream in the desorption step. Here, the carbon dioxide rich stream is compressed after the adsorption-desorption step and the heat generated is used for matching the heat demand, resulting in significant requirement of energy to carry out the process.

WO 2012083108 discloses sodium carbonate enriched sorbent based adsorption process for carbon dioxide capture. The method utilizes the exothermic heat from the adsorber via heat exchange with LPG or propane as the working fluid for production of power. This requirement of additional LPG or propane adds to the costs and inventory.

U.S. Pat. No. 5,917,136 discloses a pressure swing adsorption process for carbon dioxide capture that uses modified alumina adsorbents. The modified adsorbents have carbon dioxide sorption capacities of about 0.11-0.29 mmoles/g, however, they are of expensive nature.

Most of the processes for capturing carbon dioxide from air or flue gas stream utilize heat from an external source together with the heat made available by compressing the desorbed vapor product (pure carbon dioxide). However, this type of heat utilization does not significantly increase the cost-efficiency of the process.

A need is, therefore, felt for developing a simple, energy efficient and economic process as well as a system for the removal of carbon dioxide present in flue gases that overcomes the drawbacks associated with the prior art.

OBJECTS

Some of the objects of the present disclosure, which at least one embodiment is able to achieve, are discussed herein below.

It is an object of the present disclosure to provide a multi-compression process for capturing carbon dioxide using a capture media.

It is another object of the present disclosure to provide a cost-efficient and environment friendly process for capturing carbon dioxide using a capture media.

It is still another object of the present disclosure to provide a multi-compression system for capturing carbon dioxide using a capture media.

It is yet another object of the present disclosure to provide a cost efficient and environment friendly system for the regeneration of the carbon dioxide capture media.

It is still another object of the present disclosure to ameliorate one or more problems of the prior art or to at least provide a useful alternative.

Other objects and advantages of the present disclosure will be apparent from the following description and accompanying drawing which is not intended to limit the scope of the present disclosure.

SUMMARY

The present disclosure provides a multi-compression process for capturing carbon dioxide ($CO_2$) from a flue gas stream containing $CO_2$; said process comprising the following steps:

i. directing the flow of the flue gas stream through a first blower (B1) to obtain a pressurized flue gas stream with elevated temperature;
ii. extracting the heat from the pressurized flue gas stream in a first heat exchanger (Hex-B) using circulating thermic fluid to obtain a heated thermic fluid and a cooled pressurized flue gas stream;
iii. directing the cooled pressurized flue gas stream to a $CO_2$ adsorber (A);
iv. passing in the adsorber (A) a fluidized lean $CO_2$ capture media, to generate a stream comprising rich capture media and flue gas devoid of $CO_2$;
v. separating in a first cyclone (C1) said rich capture media and said stream of flue gas devoid of $CO_2$;
vi. directing the separated stream of flue gas devoid of $CO_2$ to a stack for further treatment;
vii. leading said separated rich capture media to a second heat exchanger (Hex-E) where it is heated to near regeneration temperature, at least partially, using said heated circulating thermic fluid to obtain a heated rich capture media;
viii. feeding said heated rich capture media to a desorber (D);
ix. heating the heated rich capture media in the desorber (D) with the help of circulating heated non-thermic fluid to desorb $CO_2$ from the heated rich capture media to generate hot lean capture media and $CO_2$ gas and optionally using a part of the generated $CO_2$ gas for fluidization of the heated rich capture media in the desorber (D);
x. separating $CO_2$ gas from the hot and lean capture media;
xi. circulating the heated non-thermic fluid through the desorber (D) by the thermosyphon principle by heating the non-thermic fluid using external waste heat (IN) in a fourth heat exchanger (Hex-A) to generate a vapor-liquid mixture, separating said vapor-liquid mixture in a vapor-liquid separator (S), further heating the separated liquid phase non-thermic fluid using the heated thermic fluid in a fifth heat exchanger (Hex-A'), converging the vapors emanating from the fifth heat exchanger (Hex-A') and the vapors directed from the vapor-liquid separator (S) in a converger (Cv), further pressurizing and heating using a booster compressor (BC) and thereafter cooling by expanding the non-thermic fluid exiting the desorber (D) through an expander (Ex) and leading the non-thermic fluid to the fourth heat exchanger (Hex-A) to reiterate the cycle; and
xii. cooling the separated hot and lean capture media in a third heat exchanger (Hex-C) to obtain cooled lean capture media using the circulating thermic fluid for adsorption in the adsorber (A) for reiteration of the process.

A portion of the cooled pressurized flue gas stream (X) can be used for fluidizing said separated capture media in the third heat exchanger (Hex-C).

The temperature of the adsorber (A) can be controlled with the help of external cold water (C/W) circulating through the adsorber (A) during the process of adsorption of the $CO_2$ on the cool and lean capture media. The adsorption reaction in the adsorber (A), takes place efficiently at a temperature ranging from 50-70° C. The capture media can be at least one selected from the group consisting of supported alkali metal carbonate, supported alkali metal oxide and supported amine.

A heavier, partially rich/lean capture media (O') emerging from the adsorber (A) is recycled via a first cyclone (C1) to the adsorber (A).

In the second heat exchanger (Hex-E), said rich capture media is heated by:
i. circulating thermic fluid leaving the third heat exchanger (Hex-C); and
ii. circulating thermic fluid received from the first heat exchanger (Hex-B) to obtain a warm thermic fluid leaving the second heat exchanger (Hex-E).

The warm thermic fluid leaving the second heat exchanger (Hex-E) can be cooled in a sixth heat exchanger (Hex-D) using an external source of cold water for further circulation in the first (Hex-B) and third heat exchanger (Hex-C).

The heated rich capture media in the desorber (D) may be heated to a temperature ranging from 130-150° C. for efficiently desorbing $CO_2$ from the heated rich capture media, to generate hot lean capture media and $CO_2$ gas. A portion of the $CO_2$ generated in the desorber (D) can be pressurized for feeding to the desorber (D), as stream (Y), and to the second heat exchanger (Hex-E) for fluidization of the rich capture media, as stream (Z).

The adsorber (A) and desorber (D) are circulating interconnected fluidized bed reactors operating in at least one regime selected from the group consisting of dense, bubbling, entrained, turbulent and fast fluidization.

The non-thermic fluid can be at least one selected from the group consisting of water, methanol, acetone, and propanol.

The $CO_2$ can be separated from the hot and lean capture media in a second cyclone (C2) and a portion of the separated $CO_2$ can be cooled in a seventh heat exchanger (Hex-F) for downstream use.

The hot and lean capture media is cooled in the third heat exchanger (Hex-C) with the help of cooled thermic fluid supplied by the sixth heat exchanger (Hex-D).

A stream of make-up capture media can be introduced in said cooled lean capture media before entering the adsorber (A).

The present disclosure further provides a multi-compression system for capturing carbon dioxide ($CO_2$) from a flue gas stream containing $CO_2$; said system comprising:
i. a first blower (B1) adapted to receive the flue gas stream and pressurize said flue gas stream to generate a pressurized flue gas stream with elevated temperature;
ii. a first heat exchanger (Hex-B) adapted to receive said pressurized flue gas stream and thermic fluid and transfer heat from said pressurized flue gas stream to said thermic fluid to obtain heated thermic fluid and a cooled pressurized flue gas stream;
iii. an adsorber (A) adapted to receive said cooled pressurized flue gas stream, fluidized cool and lean capture media and cooled lean capture media emerging from a third heat exchanger (Hex-C), said capture media adapted to adsorb $CO_2$ to generate a rich capture media and a stream of flue gas devoid of $CO_2$;
iv. a second heat exchanger (Hex-E) adapted to receive said rich capture media and heat, by heated thermic fluid received from the first heat exchanger (Hex-B) and from the third heat exchanger (Hex-C), said rich capture media to near a predefined regeneration temperature, to obtain a heated rich capture media;
v. a desorber (D) adapted to receive said heated rich capture media and further heat said heated rich capture media to desorb $CO_2$ to generate a hot and lean capture media and $CO_2$ gas;

vi. a third heat exchanger (Hex-C) adapted to cool said hot and lean capture media to generate cooled lean capture media for the adsorption in said adsorber (A);

vii. a thermic fluid circulating system adapted to circulate said thermic fluid through said first heat exchanger (Hex-B), said second heat exchanger (Hex-E), said third heat exchanger (Hex-C), a fifth heat exchanger (Hex-A') and a sixth heat exchanger (Hex-D);

viii. a non-thermic fluid circulating system adapted to circulate non-thermic fluid through said desorber (D);

ix. a vapor-liquid separator (S) adapted to receive a vapor liquid mixture from a fourth heat exchanger (Hex-A) and separate the vapor and liquid phases of non-thermic fluid;

x. a fifth heat exchanger (Hex-A') adapted to receive the liquid phase of the non-thermic fluid from the vapor-liquid separator (S) and vaporize said liquid phase;

xi. a converger (Cv) adapted to converge the vapors emanating from the fifth heat exchanger (Hex-A') and the vapors directed from the vapor-liquid separator (S) and direct the combined vapors of the non-thermic fluid to a booster compressor (BC);

xii. the booster compressor (BC), on-line in the non-thermic fluid circulating system, adapted to compress and heat the combined vapors of the non-thermic fluid before being fed to the desorber (D);

xiii. an expander (Ex), on-line in the non-thermic fluid circulating system, adapted to depressurize and cool said non-thermic fluid exiting the desorber (D) for being heated in the fourth heat exchanger (Hex-A) using external waste heat (IN); and xiv. the sixth heat exchanger (Hex-D) adapted to receive thermic fluid from said second heat exchanger (Hex-E) and cool said thermic fluid for supplying cool thermic fluid to said first (Hex-B) and third heat exchanger (Hex-C).

The system of the present disclosure further includes a first cyclone (C1) adapted to separate said hot and rich capture media and said stream of flue gas devoid of $CO_2$.

The system of the present disclosure further includes a second cyclone (C2) adapted to separate said hot and lean capture media and $CO_2$ gas.

The system of the present disclosure further includes a cold water source adapted to supply cold water (C/W) to said adsorber (A) and said sixth heat exchanger (Hex-D).

The cold water source can be further used to cool the $CO_2$ produced in the system.

The system of the present disclosure further includes a second blower (B2) adapted to receive $CO_2$ gas from said second cyclone (C2) and supply pressurized $CO_2$ gas to said desorber (D), as stream (Y), and said second heat exchanger (Hex-E), as stream (Z).

The capture media can be at least one selected from the group consisting of supported alkali metal carbonate, supported alkali metal oxide and supported amine.

The adsorber (A) and the desorber (D) are circulating interconnected fluidized bed reactors operating in at least one regime selected from the group consisting of dense, bubbling, entrained, turbulent and fast fluidization.

The non-thermic fluid can be at least one selected from the group consisting of water, methanol, acetone, and propanol.

A make-up capture media stream can be introduced in said cooled lean capture media exiting the third heat exchanger (Hex-C) before entering the adsorber (A).

BRIEF DESCRIPTION OF THE ACCOMPANYING DRAWINGS

The disclosure will now be described with reference to accompanying non-limiting drawing:

FIG. 1 illustrates a schematic diagram of a multi-compression system (100) for capturing carbon dioxide contained in flue gas using a carbon dioxide capture media.

DETAILED DESCRIPTION

The present disclosure relates generally to the capture of carbon dioxide from a variety of flue gas sources including, without limitation, those from oil refineries, fossil fuel based power plants, cement plants and any other potential source of emissions. The invention of the present disclosure involves a multiple-compression cycle for compressing flue gas produced from the afore-stated sources. The process involves the use of a high temperature heat transfer fluid (thermic fluid) for extracting the heat generated due to the compression and a heat pump for selective compression and expansion of a circulating non-thermic fluid that utilizes the process plant waste heat, for compensating the heat demand in the step of regeneration of the capture media.

In accordance with the present disclosure, there is provided a system (100) and process for capturing carbon dioxide ($CO_2$) from a flue gas stream containing $CO_2$, in that, the disclosure also provides a process for the regeneration of the carbon dioxide capture media. The system and process will now be explained with reference to FIG. 1; the key components of the system being referenced generally by numerals as indicated in the accompanying drawing.

In accordance with the present disclosure the system (100) comprises the following components:
a first blower (B1);
a first heat exchanger (Hex-B);
an adsorber (A);
a second heat exchanger (Hex-E);
a desorber (D);
a third heat exchanger (Hex-C);
a thermic fluid circulating system;
a non-thermic fluid circulating system;
a booster compressor (BC);
an expander (Ex);
a fourth heat exchanger (Hex-A);
a vapor-liquid separator (S);
a converger (Cv);
a fifth heat exchanger (Hex-A'); and
a sixth heat exchanger (Hex-D).

The process of the present disclosure initially includes directing the flow of a hot flue gas stream sourced from an external plant or apparatus, containing $CO_2$, through a first blower (B1). The first blower is employed to increase the pressure and the temperature of the flue gas stream.

The pressurized flue gas stream from the first blower (B1) is received by the first heat exchanger (Hex-B) and the first heat exchanger (Hex-B) extracts heat from the pressurized flue gas stream with the help of thermic fluid which is circulated through the heat exchanger (Hex-B); thereby generating a heated thermic fluid and a cooled pressurized flue gas stream. The extraction of heat is achieved by means of circulating thermic fluid emerging from the sixth heat exchanger (Hex-D). Typically, the circulating thermic fluid includes but is not limited to oils, hydrocarbon oils such as Dowtherm and glycols. The adsorber (A) receives the cooled pressurized flue gas stream and a fluidized cool and lean capture media, where the cool and lean capture media adsorbs the $CO_2$ and generates a rich capture media (capture media with adsorbed $CO_2$) along with a stream of flue gas devoid of $CO_2$ (O). The capture media of the present disclosure is operable under fluidization mode. The cooled pressurized flue gas stream emerging from the first heat exchanger (Hex-A), on entry in the adsorber (A), fluidizes the capture media. This is done in order to cause maximum adsorption of the $CO_2$ gas on the capture media by preventing it from forming a cake at the bottom of the adsorber (A) and sticking to the reactor wall or polymerizing. The high pressure flue gas causes the capture media to fluidize and to move against gravity which ensures that maximum surface area of the capture media is exposed to the flue gas stream containing $CO_2$. Typically, the capture media includes but is not limited to supported alkali metal carbonate, supported alkali metal oxide and supported amine. The sorption capacity of the capture media ranges between 50 and 200 grams of carbon dioxide per kilogram of the capture media. Further, the capture media of the present disclosure has substantially the same sorption capacity (>99%) after regeneration as the capture media prior to adsorption of carbon dioxide. An external supply of cold water (C/W) is introduced to control the increase in temperature of the adsorber (A) as the adsorption reaction is exothermic. The adsorption reaction in the adsorber (A), takes place efficiently at a temperature ranging from 50-70° C. The external source of cold water for cooling maintains fast kinetics and minimizes the total adsorption time. Due to the drag force of the flue gas flow over the capture media bed, the capture media particles are carried upwards through the adsorber (A) to the first cyclone (C1). The first cyclone (C1) separates the rich capture media with adsorbed $CO_2$ and the stream of flue gas devoid of $CO_2$ (O). The stream of flue gas devoid of $CO_2$ is sent to stack for further treatment and vent to atmosphere whereas the rich capture media is reintroduced at the bottom of the adsorber (A), as stream (O'). The second heat exchanger (Hex-E) receives the rich capture media and heats the rich capture media to near a predefined regeneration temperature, to obtain a heated rich capture media. The second heat exchanger (Hex-E) reduces the thermal load on the desorber (D) which is used downstream. The heating in the second heat exchanger (Hex-E) is brought about by the circulating thermic fluid emerging from the first heat exchanger (Hex-B) and the third heat exchanger (Hex-C). A heated rich capture media stream and two warm thermic fluid streams are found to emerge from the second heat exchanger (Hex-E). The warm thermic fluid streams are cooled in a sixth heat exchanger (Hex-D) by an external source of cold water to provide a cooled thermic fluid stream that is forwarded to the first heat exchanger (Hex-B) and third heat exchanger (Hex-C).

The heated rich capture media emerging from the second heat exchanger (Hex-E) is then fed into a desorber (D) where it is regenerated by hot circulating non-thermic fluid. The circulating non-thermic fluid before entering the desorber (D) is heated in a fourth heat exchanger (Hex-A) using external waste heat (IN) to obtain a vapor mixture. The vapor and liquid phases of the vapor mixture are separated in a vapor-liquid separator (S). The liquid phase is fed into a fifth heat exchanger (Hex-A') and heated by a heated thermic fluid stream sourced from the first heat exchanger (Hex-B). The vapors resulting from the fifth heat exchanger (Hex-A') as well as the vapors directed from the separator (S) are converged in a converger (Cv), after which they are passed through a booster compressor (BC) to provide compressed non-thermic fluid which is further passed through the desorber (D). The necessary thermal energy required for regeneration of rich capture media in desorber (D) is provided by latent heat of condensation of the non-thermic fluid. The step of heating causes $CO_2$ desorption (capture media regeneration) and generates a hot and lean capture media and $CO_2$ gas. The regeneration reaction in the desorber (D), takes place efficiently at a temperature ranging from 130-150° C. Although any reactor which can circulate catalyst continuously may be employed for the adsorption and desorption processes, circulating interconnected fluidized bed reactors are used as they (i) facilitate uniform temperature distribution due to rapid mixing and hence provide energy efficiency due to exchange of heat with the circulating sorbent; (ii) reduce the effect of gas bypassing and hence, cause high heat and mass transfer rates between gas and particles; (iii) avoid hot spots generation during exothermic adsorption reaction; (iv) offer high superficial velocity to reduce the reactor size. Typically, the adsorber (A) and the desorber (D) are interconnected circulating fluidized bed reactors operating in regime of dense, bubbling, entrained, turbulent, fast fluidization. The compressed non-thermic fluid after passing through the desorber (D), is expanded in an expander (Ex) which cools the non-thermic fluid to be used again for heating in the fourth heat exchanger (Hex-A) and, therefore, the entire process.

The second cyclone (C2) separates the hot and lean capture media and $CO_2$ gas emerging from the desorber (D). A portion of the $CO_2$ separated in the second cyclone (C2) is cooled in a seventh heat exchanger (Hex-F) for downstream use. The second blower (B2) receives the $CO_2$ gas from the second cyclone and supplies the pressurized $CO_2$ gas to the desorber (D), as stream (Y), and to the second heat exchanger (Hex-E) for fluidization, as stream (Z). The third heat exchanger (Hex-C) receives the hot and lean capture media emerging from the desorber (D) and cools it with a cooled thermic fluid stream sourced from the sixth heat exchanger (Hex-D) to obtain a cooled thermic fluid stream. A make-up capture media stream is introduced in the cooled thermic fluid stream before entering the adsorber (A).

The system of the present disclosure includes a thermic fluid circulating system and a non-thermic fluid circulating system. The thermic fluid circulating system circulates the thermic fluid through the first heat exchanger (Hex-B), the second heat exchanger (Hex-E), the third heat exchanger (Hex-C), the fifth heat exchanger (Hex-A'), the sixth heat exchanger (Hex-D) and functions to regulate the temperature and enthalpy of the entire system (100).

The invention of the present disclosure employs a heat pump concept for selective compression and expansion of the non-thermic fluid. Typically, the non-thermic fluid is selected from the group that includes but is not limited to water, methanol, acetone, and propanol. Further, the non-thermic fluid has boiling point in range of 25 to 105° C. and workable under a pressure range of 1-10 bar and also with higher latent heat of vaporization/condensation. The heat pump concept involves cyclic evaporation, compression, condensation and expansion of the non-thermic fluid by process plant waste heat (IN). Here, the non-thermic fluid is evaporated by the process plant waste heat available at a temperature as low as 50° C. and as high as 200° C. to recover its thermal energy, and thereafter compressed to saturated vaporized state and further condensed to utilize its latent of condensation. The sources of low temperature process waste heat in oil refineries include, without limitation, refinery column overhead products where the streams are cooled using fin-fan coolers or water coolers, while in power plant include thermal process streams or from other industrial process. Although, any temperature level of process plant waste heat can be utilized for its usage in capture media regeneration, use of heat pumps for transferring heat energy from a heat source to a heat sink against a temperature gradient is preferred by using a relatively small amount of high quality drive energy such as electricity, fuel and high-temperature waste heat.

Thus, the non-thermic fluid before entering the desorber (D), is heated in the fourth heat exchanger (Hex-A) using external waste heat (IN). The fifth heat exchanger (Hex-A') receives the resultant partially vaporized non-thermic fluid and further heats it by a heated thermic fluid stream sourced from the first heat exchanger (Hex-B). The booster compressor (BC) receives the resultant vaporized non-thermic fluid and compresses the same to a pressure such that the condensation temperature of the non-thermic fluid is higher than the regeneration temperature. The resultant compressed non-thermic fluid is passed to and through the desorber (D). The expander (Ex) receives the compressed non-thermic fluid emerging from the desorber (D) and cools it by expanding to provide the non-thermic fluid that may be reiteratively used in the process. The cooled non-thermic fluid assumes liquid phase after de-pressurizing in the expander.

In an optional embodiment of the process of the present disclosure, the cooled pressurized flue gas stream, emerging from the first heat exchanger (Hex-B), is used for fluidizing the hot and lean capture media in the third heat exchanger (Hex-C), as stream (X).

The invention of the present disclosure employs the multi-compression cycle. The compression cycle in each stream loop like flue gas stream and the non-thermic fluid stream, provides necessary heat and its re-utilization for regeneration of capture media. The flue gas with/without excess quantity, with the aid of the circulating thermic fluid, is compressed in a first compression cycle to generate the required quantity of heat that can be used within the capture process. The compression of the non-thermic fluid in the second compression cycle generates sufficient energy which finds its usage in regeneration of capture media and also within the process to compensate the heat demand.

The present invention distinctly characterizes the method to compensate the shortfall in heat demand within the process by the use, in combination, of recovery of low temperature process waste heat by the non-thermic fluid using the heat pump principle and recovery of flue gas heat by the thermic fluids. The low temperature process waste heat streams which are available in process plants cannot be used for steam generation. Sources of low temperature process waste heat in oil refinery may include, without limitations, particularly refinery column overhead products where the streams are cooled using fin-fan coolers or water cooler, while in power plant it may include thermal process streams or from other industrial process. Thus, a huge amount of heat which is otherwise wasted can be reused for regeneration of the capture media in the process of carbon dioxide capture.

Further, the invention of the present disclosure offers advantages over the conventional amine based absorption process, for all key performance parameters. The total heat required for regeneration of the capture media in the conventional amine based absorption process is higher than that required in the process of the present disclosure. The flue gas cooler in the present invention recovers maximum heat associated with the flue gas stream to utilize within the process. On the other hand, most of the heat is lost during the cooling in the conventional amine process. In any capture process, the steam requirement significantly influences the operating cost associated with the regeneration of the capture media, but the present invention judiciously tackles the problem of heat demand for the regeneration step by utilizing the heat available with flue gas stream, which is an insignificant value as compared to the generation of steam. Similarly, the quantity of cooling water required in the present disclosure is appreciably lower than that required in the conventional amine based process.

The present disclosure will now be discussed in the light of the following non-limiting embodiments:

Example 1

The Process of Capture of $CO_2$ According to the Present Disclosure and its Comparison With the Conventional Absorption Process A] The Process of Capture of $CO_2$ According to the Present Disclosure:

A stream of 65 (tonnes per hour) TPH of flue gas [carbon dioxide: 16, oxygen: 2 and nitrogen: rest, composition on the dry basis (vol %)] at 160° C. temperature and 1 bar pressure was introduced into a first blower (1.31 MW) to obtain a 65 TPH flue gas stream at 228° C. temperature and 1.5 bar pressure. The pressurized flue gas stream was forwarded into a first heat exchanger where the heat from the pressurized stream was extracted by circulating Dowtherm as the thermic fluid at 40° C. that is made to pass through the first heat exchanger. The thermic fluid at 40° C. was sourced from a sixth heat exchanger in the system. After the extraction of heat, a 65 TPH cooled pressurized flue gas stream at 55° C. temperature and 1.4 bar pressure and a 37.65 TPH heated thermic fluid stream at 215° C. was obtained.

The cooled pressurized flue gas stream was diverted into a $CO_2$ adsorber, where fluidized cool and lean capture media-potassium carbonate supported on alumina was also introduced. The fluidized cool and lean capture media adsorbed the $CO_2$ present in the flue gas stream to generate a 52.5 TPH of flue gas stream devoid of $CO_2$ at 70° C., which was exhausted to the stack. A 132.5 TPH capture media rich with adsorbed $CO_2$ at 70° C., was also obtained. The temperature of the adsorber was controlled (55° C.) with the help of external cold water at 30° C. that was made to circulate through the reactor. The rich capture media emerging from the adsorber after separation from $CO_2$ flue gas in the first cyclone was recycled to the adsorber.

The 132.5 TPH of rich capture media at 70° C. was moved to a second heat exchanger where the rich capture media was heated to near a regeneration temperature of about 130° C., at least partially, using Dowtherm as a first thermic fluid stream (26.5 TPH) at 215° C. emerging from the first heat exchanger and Dowtherm again as the second thermic fluid stream (88.5 TPH) at 110° C. emerging from a third heat exchanger. A 132.5 TPH heated rich capture media stream at 130° C. and two warm thermic fluid streams at 110° C. and 80° C. were found to emerge from the second heat exchanger. The warm thermic fluid streams were cooled in the sixth heat exchanger by using externally cooled water at 30° C. The cooled thermic fluid streams were then forwarded to the first and third heat exchanger.

The 132.5 TPH of heated rich capture media at 130° C. emerging from the second heat exchanger was then fed into a desorber (D) where it was regenerated at 130° C. by utilizing heat provided by latent heat of condensation of 13.5 TPH of compressed water-vapor (non-thermic fluid) stream at 232° C. at 3.25 bar pressure.

The 13.5 TPH of compressed non-thermic fluid stream at 232° C. was obtained through the following non-thermic fluid circulating system:

A non-thermic fluid was heated in a fourth heat exchanger by means of waste process plant heat to obtain 13.5 TPH of vapor admixture at 114° C. and 1.55 bar pressure (94.4% vapor).

The 13.5 TPH of the vapor admixture from the fourth heat exchanger (Hex-A) was fed into a vapor-liquid separator to separate 12.746 TPH fully vaporized non-thermic fluid and 0.754 TPH of non-thermic fluid in liquid phase.

The 0.754 TPH of the non-thermic fluid stream in liquid phase, emerging from the vapor liquid separator was passed through a fifth heat exchanger where the stream was heated by 11.15 TPH of thermic fluid at 215° C., sourced from the first heat exchanger.

The fully vaporized non-thermic fluid stream from liquid-separator and that obtained from the fifth heat exchanger (Hex-A') was fed to a converger to obtain 13.5 TPH of the non-thermic fluid at 113° C. at 1.45 bar pressure (100% vapor).

The 13.5 TPH of the fully vaporized non-thermic fluid stream was then passed through an electrically operated booster compressor (0.85 MW) which provided non-thermic fluid stream at 232° C. at 3.25 bar pressure.

The step of heating caused the $CO_2$ from the heated rich capture media to be desorbed; thereby generating a mixture of 120 TPH of the hot and lean capture media at 130° C. and 12.5 TPH $CO_2$ gas. The $CO_2$ gas was separated from the hot and lean capture media in a second cyclone and a portion of the separated $CO_2$ was cooled using cold water at 30° C. Another portion of the $CO_2$ gas stream was used for the fluidization of the heated rich capture media in the desorber (D) and the second heat exchanger.

The separated hot and lean capture media was directed to a third heat exchanger for cooling using 88.5 TPH of the thermic fluid at 40° C. that was sourced from the sixth heat exchanger. The resultant 120 TPH cooled lean capture media at 55° C. was directed to the adsorber for reiteration of the process. A make-up capture media stream was also introduced in the cooled lean capture media before entering the adsorber.

B] Comparison of the Process of the Present Disclosure With the Conventional Absorption Process:

$CO_2$ capture achieved by the conventional amine based absorption process and the process of the present disclosure has been provided in Table 1 that illustrates the efficacy of the process of the present disclosure vis-à-vis the conventional amine based absorption process, on the basis per tonnes of carbon dioxide.

TABLE 1

Comparison of the process of the present disclosure with the conventional absorption process

| Key Performance Parameters (Basis: per ton of carbon dioxide capture) | Conventional abs. Process | Present process |
|---|---|---|
| Temp. (° C.) window for flue gas stream from refinery/power plant | 160-250 | 160-250 |
| Flue gas blower pressure window (bar) | 1.5-2.0 | 1.5-2.0 |
| Temp. window of pressurized flue gas for sorption (° C.) | 30-40 | 50-65 |
| Temp. window of solvent/sorbent regeneration (° C.) | 105-120 | 130-150 |
| Temp. window for process plant waste heat stream (° C.) | NA | 90-150 |
| Temp. differential for working fluid between evaporation to condensation (° C.) | NA | 110-120 |
| Total energy requirement (GJ) | 3.0-4.2 | 0.375-0.4 |
| External steam for regeneration @ 4 Bar (ton) | 2.0-3.5 | 0.0 |
| Cooling water (m³) | 70-105 | 40-50 |
| Electricity power (MW) | 1.75-2.0 | 1.5-2.0 |
| Operating cost | B[b] | (0.15-0.2) × B |

NA: not applicable
[a] heat is lost in cooling flue gas stream to attain absorption temperature
[b] Baseline cost = B The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Technical Advantages and Economic Significance

The process and system of the present disclosure harness the heat associated with the flue gas along with the process waste heat and utilizes it to replenish the heat requirement within the process.

The invention of the present disclosure also provides a heat integrated process that significantly reduces the operating cost by using a multiple-compression cycle for regeneration of the capture media used for carbon dioxide capture from flue gas stream.

The process and system of the present disclosure can be easily retrofitted to existing facilities.

The invention of the present disclosure involves a heat pump that ensures that pumping of energy from a lower to a higher potential through single step compression of the non-thermic fluid and hence, rejection of heat at the higher temperature by condensation provides sufficient heat for regeneration step.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A multi-compression process for capturing carbon dioxide ($CO_2$) from a flue gas stream containing $CO_2$; said process comprising the following steps:
   i. directing the flow of the flue gas stream through a first blower to obtain a pressurized flue gas stream with elevated temperature;
   ii. extracting the heat from the pressurized flue gas stream in a first heat exchanger using circulating thermic fluid to obtain a heated thermic fluid and a cooled pressurized flue gas stream;
   iii. directing the cooled pressurized flue gas stream to a $CO_2$ adsorber;
   iv. passing in the adsorber a fluidized lean $CO_2$ capture media to generate a stream comprising rich capture media and flue gas devoid of $CO_2$;
   v. separating in a first cyclone said rich capture media and said stream of flue gas devoid of $CO_2$;
   vi. directing the separated stream of flue gas devoid of $CO_2$ to a stack for further treatment;
   vii. leading said separated rich capture media to a second heat exchanger where it is heated to near regeneration temperature, at least partially, using said heated circulating thermic fluid to obtain a heated rich capture media;
   viii. feeding said heated rich capture media to a desorber;
   ix. heating the heated rich capture media in the desorber with the help of circulating heated non-thermic fluid to desorb $CO_2$ from the heated rich capture media to generate hot lean capture media and $CO_2$ gas and optionally using a part of the generated $CO_2$ gas for fluidization of the heated rich capture media in the desorber;
   x. separating $CO_2$ gas from the hot and lean capture media;
   xi. circulating the heated non-thermic fluid through the desorber by the thermosyphon principle by heating the non-thermic fluid using external waste heat in a fourth heat exchanger to generate a vapor-liquid mixture, separating said vapor-liquid mixture in a vapor-liquid separator, further heating the separated liquid phase non-thermic fluid using the heated thermic fluid in a fifth heat exchanger, converging the vapors emanating from the fifth heat exchanger and the vapors directed from the vapor-liquid separator in a converger, further pressurizing and heating using a booster compressor and thereafter cooling by expanding the non-thermic fluid exiting the desorber through an expander and leading the non-thermic fluid to the fourth heat exchanger to reiterate the cycle; and
   xii. cooling the separated hot and lean capture media in a third heat exchanger to obtain cooled lean capture media using the circulating thermic fluid for adsorption in the adsorber for reiteration of the process.

2. The process as claimed in claim 1, wherein a portion of the cooled pressurized flue gas stream is used for fluidizing said separated capture media in the third heat exchanger.

3. The process as claimed in claim 1, wherein the temperature of the adsorber is controlled with the help of external cold water circulating through the adsorber during the process of adsorption of the $CO_2$ on the cool and lean capture media.

4. The process as claimed in claim 1, wherein said capture media is at least one selected from the group consisting of supported alkali metal carbonate, supported alkali metal oxide and supported amine.

5. The process as claimed in claim 1, wherein a heavier, partially rich/lean capture media emerging from the adsorber is recycled via a first cyclone to the adsorber.

6. The process as claimed in claim 1, wherein, in the second heat exchanger, said rich capture media is heated by:
   i. circulating thermic fluid leaving the third heat exchanger; and
   ii. circulating thermic fluid received from the first heat exchanger to obtain a warm thermic fluid leaving the second heat exchanger.

7. The process as claimed in claim 1, wherein the warm thermic fluid leaving the second heat exchanger is cooled in a sixth heat exchanger using an external source of cold water for further circulation in the first and third heat exchanger.

8. The process as claimed in claim 1, wherein a portion of the $CO_2$ generated in the desorber is pressurized for feeding to the desorber, as stream, and to the second heat exchanger for fluidization of the rich capture media, as stream.

9. The process as claimed in claim 1, wherein said adsorber and desorber are circulating interconnected fluidized bed reactors operating in at least one regime selected from the group consisting of dense, bubbling, entrained, turbulent and fast fluidization.

10. The process as claimed in claim 1, wherein said non-thermic fluid is at least one selected from the group consisting of water, methanol, acetone, and propanol.

11. The process as claimed in claim 1, wherein the $CO_2$ is separated from the hot and lean capture media in a second cyclone and a portion of the separated $CO_2$ is cooled in a seventh heat exchanger for downstream use.

12. The process as claimed in claim 1, wherein the hot and lean capture media is cooled in the third heat exchanger with the help of cooled thermic fluid supplied by the sixth heat exchanger.

13. The process as claimed in claim 1, wherein a stream of make-up capture media is introduced in said cooled lean capture media before entering the adsorber.

14. A multi-compression system for capturing carbon dioxide ($CO_2$) from a flue gas stream containing $CO_2$, said system comprising:
   i. a first blower adapted to receive the flue gas stream and pressurize said flue gas stream to generate a pressurized flue gas stream with elevated temperature;
   ii. a first heat exchanger adapted to receive said pressurized flue gas stream and thermic fluid and transfer heat from said pressurized flue gas stream to said thermic fluid to obtain heated thermic fluid and a cooled pressurized flue gas stream;

iii. an adsorber adapted to receive said cooled pressurized flue gas stream, fluidized cool and lean capture media and cooled lean capture media emerging from a third heat exchanger, said capture media adapted to adsorb $CO_2$ to generate a rich capture media and a stream of flue gas devoid of $CO_2$;

iv. a second heat exchanger to receive said rich capture media and heat, by heated thermic fluid received from the first heat exchanger and from the third heat exchanger, said rich capture media to near a predefined regeneration temperature, to obtain a heated rich capture media;

v. a desorber adapted to receive said heated rich capture media and further heat said heated rich capture media to desorb $CO_2$ to generate a hot and lean capture media and $CO_2$ gas;

vi. a third heat exchanger adapted to cool said hot and lean capture media to generate cooled lean capture media for the adsorption in said adsorber;

vii. a thermic fluid circulating system adapted to circulate said thermic fluid through said first heat exchanger, said second heat exchanger, said third heat exchanger, a fifth heat exchanger and a sixth heat exchanger;

viii. a non-thermic fluid circulating system adapted to circulate non-thermic fluid through said desorber;

ix. a vapor-liquid separator adapted to receive a vapor liquid mixture from a fourth heat exchanger and separate the vapor and liquid phases of non-thermic fluid;

x. a fifth heat exchanger adapted to receive the liquid phase of the non-thermic fluid from the vapor-liquid separator and vaporize said liquid phase;

xi. a converger adapted to converge the vapors emanating from the fifth heat exchanger and the vapors directed from the vapor-liquid separator and direct the combined vapors of the non-thermic fluid to a booster compressor;

xii. the booster compressor, on-line in the non-thermic fluid circulating system, adapted to compress and heat the combined vapors of the non-thermic fluid before being fed to the desorber;

xiii. an expander, on-line in the non-thermic fluid circulating system, adapted to depressurize and cool said non-thermic fluid exiting the desorber for being heated in the fourth heat exchanger using external waste heat; and xiv. the sixth heat exchanger adapted to receive thermic fluid from said second heat exchanger and cool said thermic fluid for supplying cool thermic fluid to said first and third heat exchanger.

15. The system as claimed in claim 14, which further includes a first cyclone adapted to separate said hot and rich capture media and said stream of flue gas devoid of $CO_2$; and a second cyclone adapted to separate said hot and lean capture media and $CO_2$ gas.

16. The system as claimed in claim 14, which further includes a cold water source adapted to supply cold water to said adsorber and said sixth heat exchanger; wherein the cold water source is further used to cool the $CO_2$ produced in the system.

17. The system as claimed in claim 14, which further includes a second blower adapted to receive $CO_2$ gas from said second cyclone and supply pressurized $CO_2$ gas to said desorber, as stream, and said second heat exchanger, as stream.

18. The system as claimed in claim 14, wherein said capture media is at least one selected from the group consisting of supported alkali metal carbonate, supported alkali metal oxide and supported amine; and wherein said non-thermic fluid is at least one selected from the group consisting of water, methanol, acetone, and propanol.

19. The system as claimed in claim 14, wherein said adsorber and desorber are circulating interconnected fluidized bed reactors operating in at least one regime selected from the group consisting of dense, bubbling, entrained, turbulent and fast fluidization.

20. The system as claimed in claim 14, wherein a make-up capture media stream is introduced in said cooled lean capture media exiting the third heat exchanger before entering the adsorber.

* * * * *